United States Patent
Quick et al.

(10) Patent No.: US 8,475,095 B2
(45) Date of Patent: Jul. 2, 2013

(54) TRANSPORT UNIT AND SET FOR SECURING CARGO ITEMS

(75) Inventors: Dieter Quick, Lindlar (DE); Markus Sünger, Lindlar (DE); Hans Günther Kohl, Köln (DE)

(73) Assignee: Sonoco Development, Inc., Hartsville, SC (US)

( * ) Notice: Subject to any disclaimer, the term of this patent is extended or adjusted under 35 U.S.C. 154(b) by 13 days.

(21) Appl. No.: 13/168,228

(22) Filed: Jun. 24, 2011

(65) Prior Publication Data

US 2011/0318131 A1 Dec. 29, 2011

(30) Foreign Application Priority Data

Jun. 25, 2010 (DE) .......................... 10 2010 017 594

(51) Int. Cl.
 *B60P 7/12* (2006.01)
(52) U.S. Cl.
 USPC .............................................. 410/49; 410/47
(58) Field of Classification Search
 USPC ....................... 410/47–50, 98–100
 See application file for complete search history.

(56) References Cited

U.S. PATENT DOCUMENTS

| | | | |
|---|---|---|---|
| 2,335,518 A | 11/1943 | Koonce | |
| 2,773,564 A * | 12/1956 | Garard | 188/32 |
| 3,229,825 A | 1/1966 | Brown, Jr. | |
| 3,237,786 A | 3/1966 | Milliken | |
| 3,476,260 A | 11/1969 | Jay | |
| 4,526,500 A * | 7/1985 | Patrick | 410/48 |
| 4,685,846 A | 8/1987 | Golay et al. | |
| 5,538,376 A | 7/1996 | Borda | |
| 5,692,625 A | 12/1997 | Filipescu et al. | |
| 5,735,412 A | 4/1998 | Sheckells | |
| 5,954,465 A | 9/1999 | Ellerbush | |
| 7,270,507 B1 * | 9/2007 | Jernigan | 410/50 |
| 7,591,384 B2 * | 9/2009 | Sheckells | 211/59.4 |
| 7,641,059 B2 | 1/2010 | Lecina | |
| 2004/0020168 A1 | 2/2004 | Simonsen | |
| 2009/0035088 A1 * | 2/2009 | Powers et al. | 410/30 |
| 2010/0178127 A1 | 7/2010 | Quick et al. | |

FOREIGN PATENT DOCUMENTS

| | | |
|---|---|---|
| DE | 202009000365 U9 | 8/2009 |
| FR | 2847652 | 5/2004 |
| FR | 2876678 | 4/2006 |

(Continued)

OTHER PUBLICATIONS

Extended Search Report—EP11170794—Mailed Sep. 1, 2011.

*Primary Examiner* — Glenn Dayoan
*Assistant Examiner* — Sunsurraye Westbrook
(74) *Attorney, Agent, or Firm* — Flaster/Greenberg, P.C.

(57) ABSTRACT

A transport unit is provided for cylindrical cargo items supported on a support surface and arranged in parallel in at least two layers. The center axes of cargo items are arranged on top of one another and extend essentially in the same vertical plane. At least one tension device extends between two layers. The tension device extends from an outside edge of a cargo item to an outside edge of an opposing cargo item in the layer. At least two stop elements are positioned on respective ends of the tension device. The stop elements are formed for engaging the cargo items and at least one of the stop elements being adjustably positionable on one end of the tension device. The stop elements being connectable by the tension device in a force transferring manner relative to the cargo items.

16 Claims, 8 Drawing Sheets

FOREIGN PATENT DOCUMENTS

| | | |
|---|---|---|
| GB | 2252293 A | 8/1992 |
| WO | WO 97/44220 | 11/1997 |
| WO | WO 01/58718 A1 | 8/2001 |
| WO | WO 2007/111506 A1 | 10/2007 |

* cited by examiner

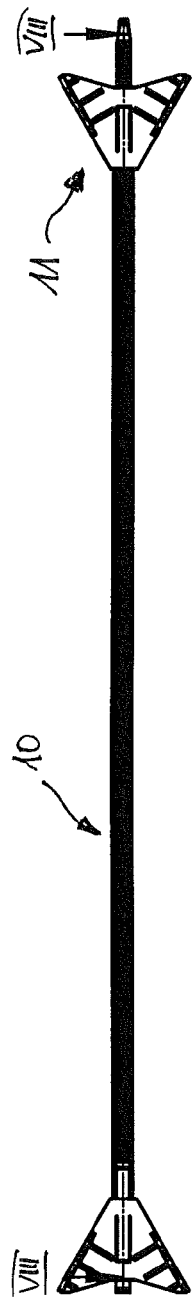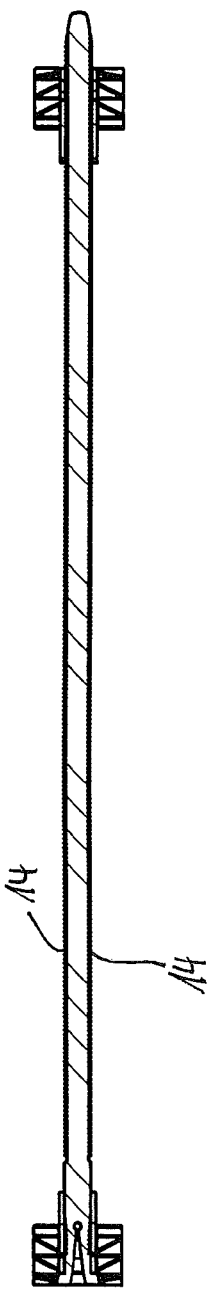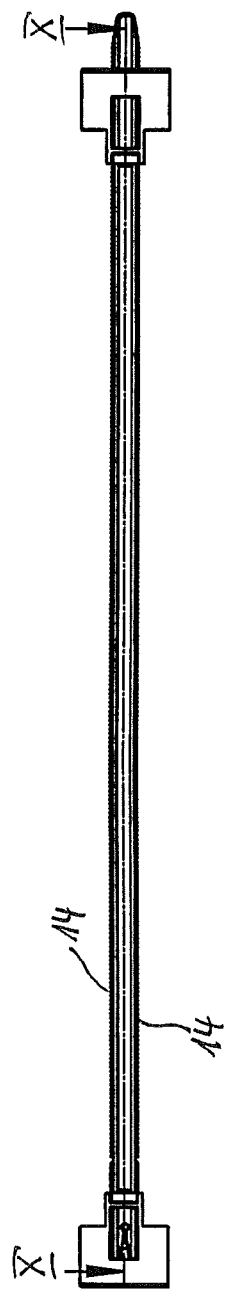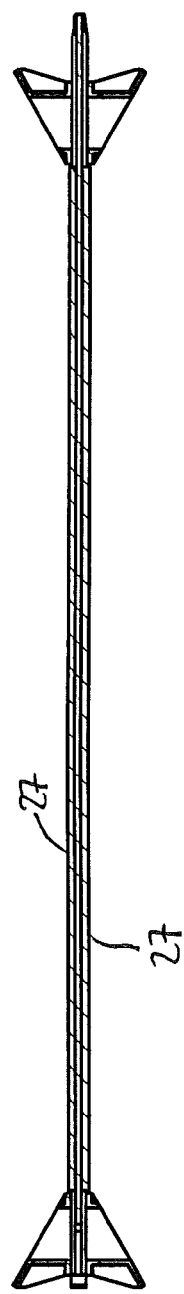
Fig. 7
Fig. 8
Fig. 9
Fig. 10

TRANSPORT UNIT AND SET FOR SECURING CARGO ITEMS

FIELD OF THE INVENTION

The present invention relates to a transport unit including:
cylindrical cargo items placed on a support surface, which are arranged parallel to one another and in at least two layers, wherein the horizontally extending center axes respectively have a distance from one another and wherein enveloping surfaces of adjacent cargo items are in a line contact with one another; and
cargo securing devices configured as tension devices, through which the cargo items are secured on the support surface against sliding or rolling in a direction perpendicular to their center axes.

The invention furthermore relates to a set for securing cylindrical cargo items.

Support surfaces in the sense of the present invention are all surfaces on which cargo items can be supported. These are also simple ground surfaces of a storage facility. Preferably, the cargo items are stored on pallets of any type, since they can be moved in a simple manner by a forklift also when they are already provided with the cargo items.

Cylindrical cargo items in the sense of the present invention are items where at least a contact surface is configured cylindrical, thus also bottle-shaped objects or e.g. gas containers. However, the term cylindrical cargo items includes in particular also coils of web shaped material, e.g. foil or paper, wherein the coils can preferably include sleeve-shaped winding cores.

BACKGROUND OF THE INVENTION

It is known in the art to transport cylindrical cargo items with a significantly smaller diameter than length that are unsuitable for a "standing" transport, lying horizontally and typically in plural layers stacked on top of one another, wherein the number of the cargo items disposed in one layer adjacent to one another decreases from the lowest layer to the top layer. The reason is that the cylindrical cargo objects of an upper layer are disposed in the free spaces of a layer disposed there under, so that they are respectively supported on two cargo items of the layer disposed there under.

The unfavorable ratio of transport volume required to actual transport volume provided. Thus, the ratio gross/net, which becomes even more unfavorable as more layers are stacked on top of one another, is a disadvantage of the known transport units identified above. Namely in the known type of stacking certain free spaces are left unused at the edges of the layers other than the lowest layer.

From DE 20 2009 000 365 U1 a transport unit of this type is known, in which the layers arranged on top of one another include the same number of cargo items, wherein the cargo items of the upper layer are still positioned in the free spaces of a layer respectively positioned there under. Therefore, the particular layers are always laterally offset relative to the adjacent layers. This is achieved in that the cargo items of a respective layer are respectively connected with tension devices at their faces, so that they are connected to form a disc. Though cargo items can be transported in this manner with significantly better gross/net ratio, however the width of the transport unit thus obtained is larger due to the second and possibly also fourth layer laterally protruding beyond the lowest layer, so that the transport unit is not suitable for transport devices with a limited width.

In order to be able to transport cargo items arranged adjacent to one another in plural layers arranged precisely on top of one another, pallets with rounded cut-outs or concave indentations are known in the art, wherein the rounded cut-outs or concave indentations are arranged below the first layer and also between two layers of cargo items. However, since differently configured pallets are required for different roll diameters a plurality of different pallets has to be stored, which causes large storage space requirements. Furthermore, this type of arranging cargo items is detrimental, since the diameters typically do not fit exactly into the concave indentations of the pallets, so that the cargo items have certain clearance in the indentations and can rock slightly. Consequently, a transport unit thus configured is not as stable as a unit configured as a block. Eventually, it is also detrimental for the pallets recited supra that the positioning is time-consuming and they cannot be sufficiently cleaned from dust and contamination, which is in particular detrimental when transporting sensitive materials.

BRIEF SUMMARY OF THE INVENTION

It is an object of the present invention to improve a transport unit of the known type, so that it is suitable for transporting layers essentially arranged precisely on top of one another and including identical numbers of cargo items, and so that a fixation of the cargo items is provided in a simple manner. Thus furthermore, a respective set shall be provided for securing the cargo items.

The object is achieved according to the invention in that the center axes of the cargo items arranged on top of one another extend essentially in the same vertical plane and at least one tension device extends between two layers and approximately perpendicular to the center axes of the cargo items, wherein at least one tension device extends from an outside of a cargo item arranged at an edge of a layer to an outside of a cargo item arranged at an opposite edge.

An enveloping surface of a cargo item, wherein the enveloping surface comes closest to an outer portion of the transport unit is interpreted as an outside of a cargo item that is arranged at an edge of a layer.

The fact that the center axes of cargo items arranged on top of one another substantially extend in the same vertical plane means in the instant application a maximum deviation between the center axis of a cargo item and a vertical plane through another cargo item of +/−10% of the diameter of the cargo items.

The geometry of the tension device is independent from the different diameter of the cargo items, so that differently from the pallets recited supra with rounded cutouts or concave indentations, no different tension devices have to be stored.

It is also advantageous, that the height of the tension device, thus the dimension in vertical direction can be selected small, so that the height of the transport unit only slightly deviates from the sum of the cargo items arranged on top of one another, which provides a compact transport unit.

According to a particularly preferred embodiment of the invention it is provided that a respective stop element is arranged at both ends of the at least one tension device, wherein the stop element is respectively arranged in a respective free space between two cargo items arranged on top of one another, and the stop element is respectively supported at the enveloping surfaces of the two cargo items, so that the stop elements are configured to react to a horizontally oriented force that is introduced by the cargo items. Consequently, the tension device is connected with the stop elements in a force-transferring manner.

The stop elements imparting pressure on the cargo items, wherein the stop elements are retained in position by tension devices that are under tension, compress the cargo items of a layer and prevent the layer from rolling apart. When the stop elements have a large width and support the cargo items over a large length, only a tension device can be provided between the layers, wherein the tension device is centrally arranged in longitudinal direction of the cargo items, since the cargo items are sufficiently supported by the stop elements that are configured accordingly wide.

Accordingly, it is provided according to the invention to fixate a layer that is arranged over another layer with only three elements, namely the tension device and two stop elements, wherein the elements can be used independently from the diameter of the cargo items and thus no different elements have to be stored for fixation.

When the stop elements are configured with a small width, at least two tension devices with two respective stop elements shall to be provided, wherein the stop elements viewed in longitudinal direction of the cargo items are arranged in the portion of the ends of the cargo items.

The fixation of the cargo items of one layer according to the invention provides an extremely simple, flexible and quick option to assemble a transport unit.

According to the invention the cargo items are stored above the at least one tension device on the tension device and are supported on the tension device so that a gap remains between cargo items that are arranged on top of one another, wherein the gap approximately corresponds to a height of the tension device.

It is advantageous when the stop elements are configured wedge-shaped and have contact surfaces which enclose an angle of at least 45°, preferably at least 50° with one another. Thus, the stop surfaces can be configured as straight surfaces or they also can be configured from slightly cambered surfaces.

In order to obtain a compact transport unit it is provided that the stop elements do not protrude beyond a vertical plane that is tangential to the edge side cargo items and oriented towards an outer portion of the transport unit. Accordingly, the width of a transport unit is only defined by the width of a layer of cargo items which is advantageous with respect to space requirements of the transport unit. Due to the position of the stop elements within the free spaces the transport unit does not have interfering edges and protrusions which could lead to injuries of the personnel handling the transport unit.

In order to implement a particularly simple and quick attachment of the stop elements at the tension device it is provided according to a preferred embodiment of the invention that the stop elements are respectively provided with a support channel for the tension device, wherein the tension device is connectable with the stop element through inserting the tension device into the support channel. The tension device can slide through a stop element completely, the stop element either has to include a dead-end channel or the tension device includes a stop at one end.

According to the invention the tension devices can be ropes, wires, bands, bars or rods which can be configured flexible or rigid.

In particular it is advantageous when the tension device is provided on at least one side at least in portions with a teething which is configured to be brought into form-locking engagement with a wall section of the support channel of the stop element which is configured as a locking catch configured as a spring loaded tongue. The respective orientation of the teething is thus provided so that moving the tension device in the stop element is possible in one direction, but not in an opposite direction.

The tension device advantageously includes respective grooves on the longitudinal sides oriented towards the cargo items; this means the tension device includes an H-shaped cross-section. Thus, it is furthermore advantageous when cushions are arranged within the grooves, wherein the cushions are respectively oriented towards the enveloping surfaces of the cargo items. This way it is mostly avoided that impressions are formed in the cargo items in the portion of the tension devices due to the relatively high punctiform load. The cushion can be made e.g. from rubber or other suitable materials, wherein furthermore a positive effect is achieved for a rubber cushion in that a friction between the cargo items and the tension devices is prevented and thus a sliding of the cargo items is prevented.

As an alternative to the configuration of the tension device with an H-profile, air cushions with rectangular cross-sections can be placed adjacent to a tension device in order to prevent impressions.

When a tension device is configured with H-shaped cross section, a respective teething should be provided on both longitudinal sides which do not include a groove.

It is advantageous when the tension device and the stop elements are configured as plastic injection molded components.

With respect to a set for securing cylindrical cargo items the object recited supra is achieved in that the set includes a tension device, wherein two wedge shaped stop elements are connectable in a force transferring manner with both ends of the tension device.

The advantages recited for the transport unit are obtained analogously for the set when the tension device at least on one side includes a teething at least in sections, wherein the teething is configured to be brought in form-locking engagement with a respective wall section of a support channel of a stop element which is configured as a locking catch shaped as a spring loaded tongue.

BRIEF DESCRIPTION OF THE DRAWINGS

The invention will be described subsequently in more detail with reference to a transport unit according to the invention with reference to drawing figures, wherein:

FIGS. 7-10 illustrate other views and sectional views of the tension device with stop elements of FIG. 2;

DETAILED DESCRIPTION

Figure 1:
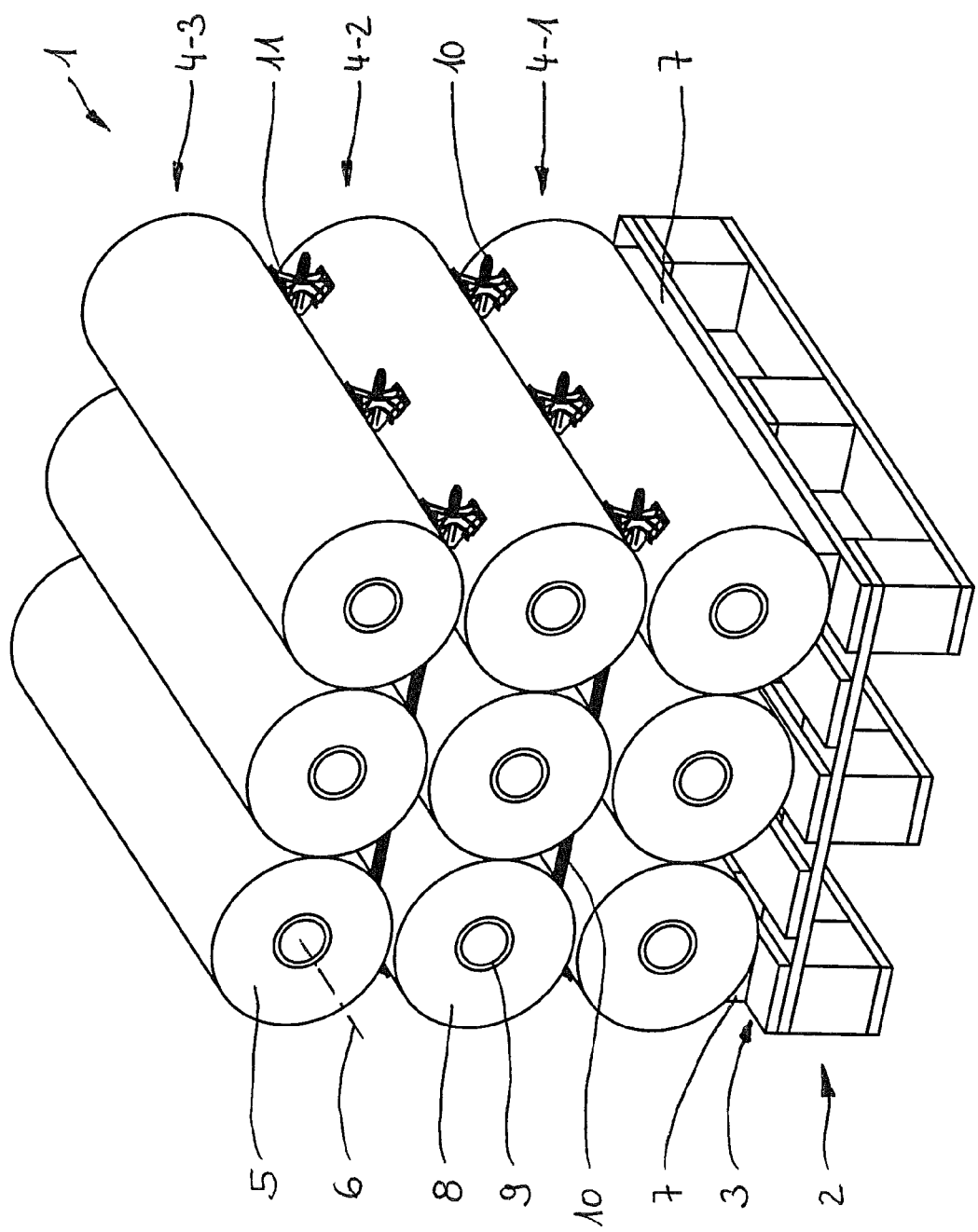
FIG. 1 illustrates a three dimensional view of a transport unit according to the invention.

FIG. 1 illustrates a transport unit 1 according to the invention in a three dimensional view including a plate shaped transport base 2 configured as a wooden pallet which is used as support surface 3 for three layers 4-1, 4-2, 4-3 of three respective cargo items 5 arranged parallel to one another with horizontally extending center axes 6. In order to secure the lowest layer 4.1 on the pallet the two outer cargo items 5 are respectively secured with an elongated wedge 7 which has approximately the same length as the cargo items 5. The two wedges 7 are made from cardboard and are provided on their top sides with bulges that correspond to the cargo items 5.

These cargo items 5 are coils 8 of a web-shaped foil, wherein the coils are wound onto a sleeve-shaped winding core 9 made from cardboard material. The diameter of the coil 8 is typically between 30 cm and 60 cm, and the length is approximately 4.00 m.

Cargo items 5 of a layer 4-1, 4-2, 4-3, which are arranged adjacent to one another, are in a linear contact with one another at their enveloping surfaces.

Between the lowest layer 4-1 and the center layer 4-2 and between the center 4-2 layer and the top layer 4-3, three respective tension devices 10 are arranged which extend perpendicular to the center axes 6 of the cargo items 5 and which are longer than of the sum of three diameters of a cargo item 5. One respective tension device 10 is approximately centrally arranged in longitudinal direction of the cargo items 5, whereas the two other tension devices are positioned in the portion of the ends of the cargo items 5.

The cargo items 5 of the center and upper layer 4-2, 4-3, have punctiform contact with the horizontally extending tension devices 10, so that a respective gap that corresponds to the height of the tension devices 10 remains between cargo items 5 arranged on top of one another.

Figure 4:
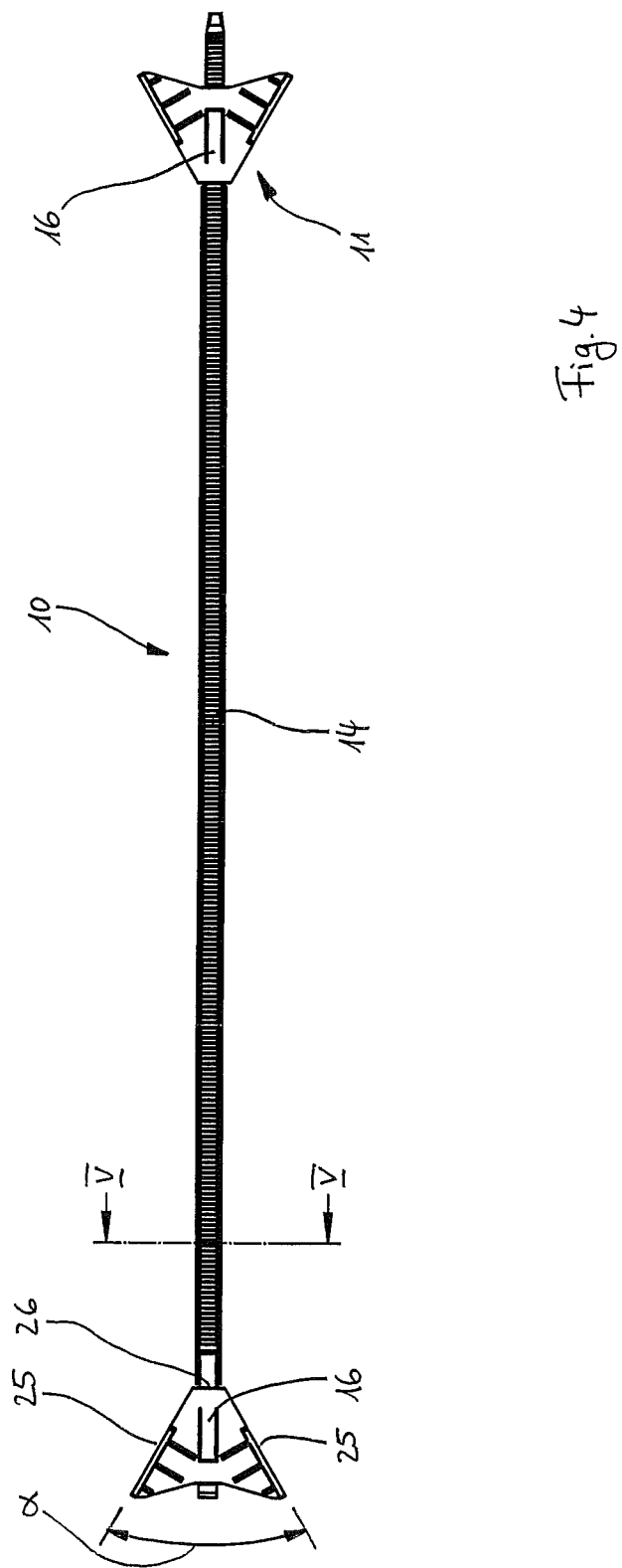
FIG. 4 illustrates a lateral view of the tension device with stop elements according to FIG. 2.

The tension devices 10 are respectively provided with a stop element 11 at both their ends, wherein the stop element is configured wedge-shaped and is configured like an equal-side triangle in a lateral view (see FIG. 4). The stop elements 11 are respectively arranged in free spaces between two cargo items arranged on top of one another, so they are supported at the envelopment surfaces of the cargo items 5. Thus, the stop elements 11 are connected with the associated tension devices 10 in a force transferring manner, so that the cargo items 5 of a layer 4-1, 4-2, 4-3 are pressed against one another, and so that they cannot roll apart.

The stop elements 11 are sized so that they do not protrude beyond the outer edges of the cargo items 5, so that the width of the transport unit 1 according to the invention corresponds to approximately three times the diameter of a cargo items 5, wherein ideally the center axes 6 of cargo items 5 respectively arranged on top of one another, are arranged in the same vertical plane.

In case the stop elements are configured significantly wider than in FIG. 1, it is also possible to arrange only one tension device between the layers with stop elements engaging at ends of the tension device.

Figure 2:
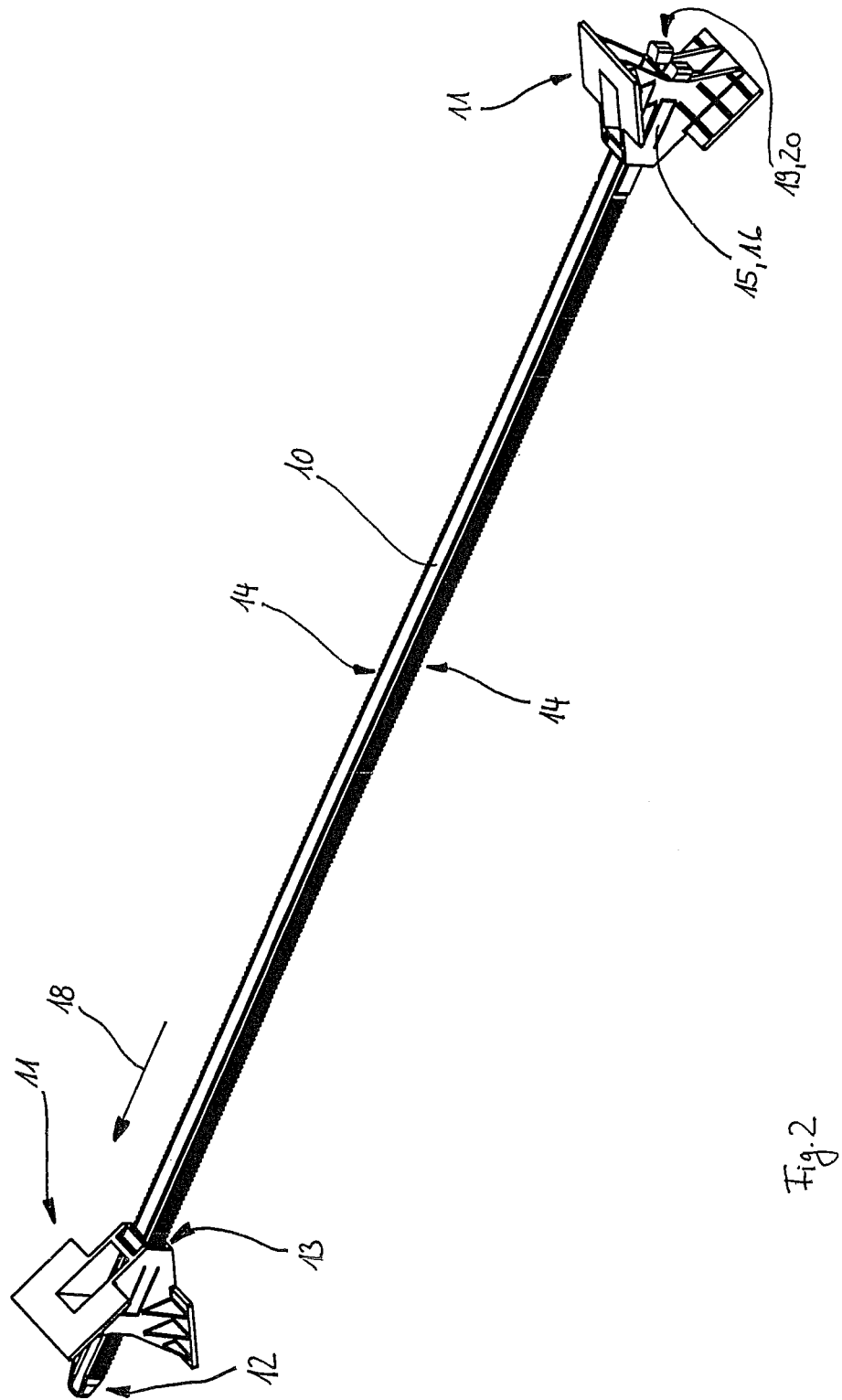
FIG. 2 illustrates a three dimensional view of the tension device with stop elements according to FIG. 1.
Figure 6:
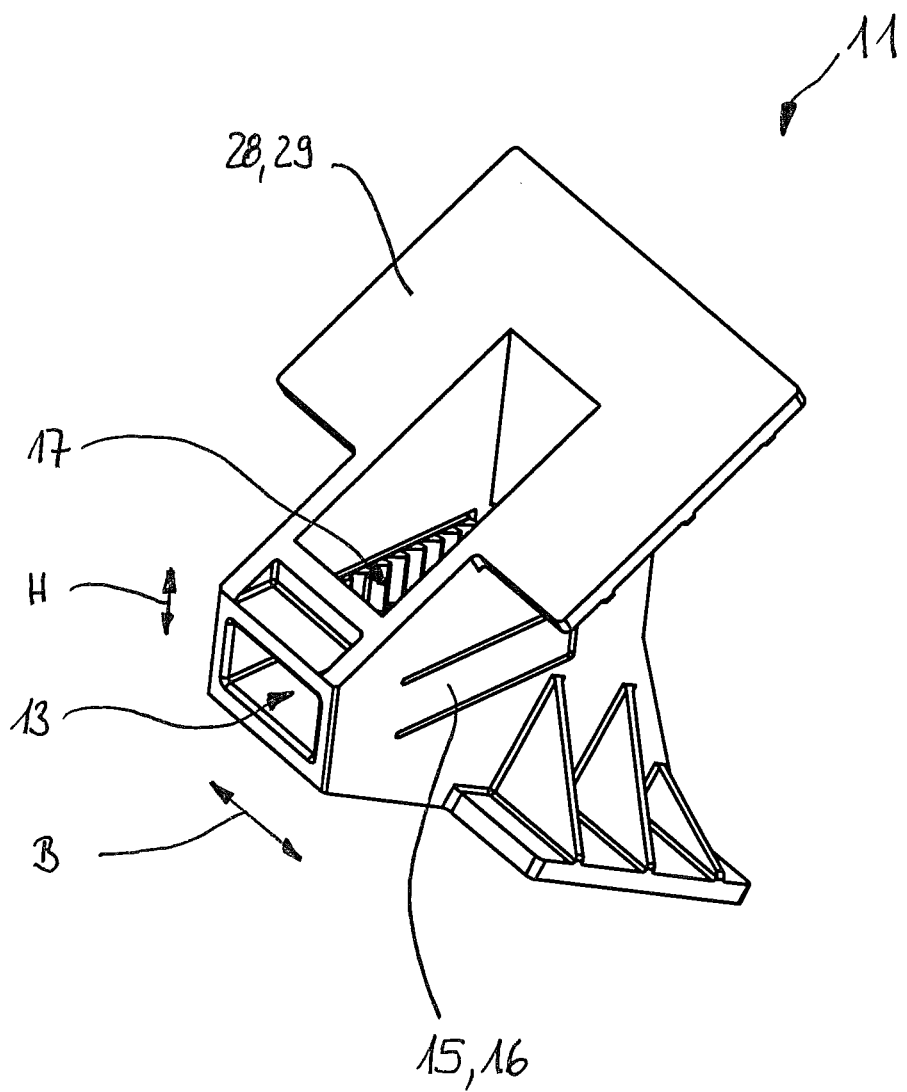
FIG. 6 illustrates a three dimensional view of a stop element of FIG. 1.

FIG. 2 illustrates a three dimensional view of a tension device 10 with stop elements 11 arranged at both ends of the tension device. It is evident that the tension device 10 is configured conical at its first end 12, so that it can be easily inserted into support channel 13 in the stop element 11. The tension device 10 respectively includes a teething 14 on its two short longitudinal sides, wherein the teething can be brought into form locking engaging with a wall section 15 of the support channel 13 of the stop element 11, wherein the wall section 15 is configured as spring-elastic tongue 16 which is also provided with a teething 17 (FIG. 6).

This means that inserting the tension device 10 in a direction illustrated by an arrow 18 is possible, but an opposite movement is not possible. Closures of this type are known e.g. from so-called cable-ties.

The opposite end 19 of the tension device 10 includes a stop 20 (see FIG. 3), which is formed by a cross-sectional step of the tension device 10. The stop 20 provides that the tension device 10 does not completely slide through the support channels 13 of the stop elements 11, and thus would ineffective.

Figure 3:
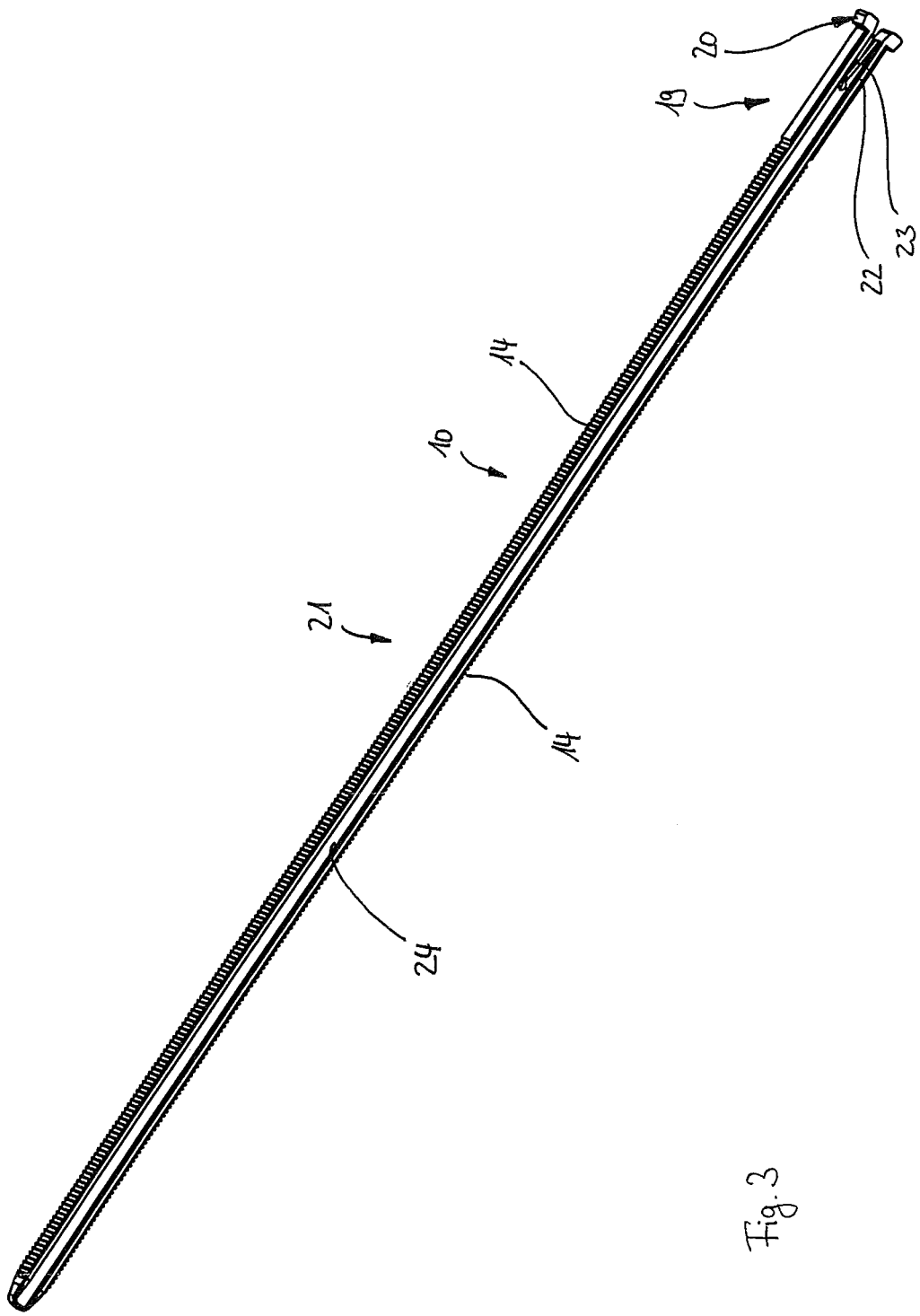
FIG. 3 illustrates a three dimensional view of the tension device according to FIG. 2.

The precise configuration of the tension device 10, which is rectangular in cross-section, can be derived from FIG. 3. The tension device 10 configured as a rigid rod 21 includes a rectangular cross section with two short sides and two long sides, wherein the long sides respectively approximately correspond to a width B of the support channel 13 of the stop element 11, or slightly undercut the width, and the short sides respectively approximately correspond to a height H of the support channel 13 (see FIG. 6) or slightly undercut the height H.

The rod 21 is provided with the teething 14 recited supra on a major portion of its short longitudinal sides.

Furthermore, the fork-shaped end 19 of the tension device 10, which forms the stop 20, is well visible in FIG. 3. The actual stop 20 is formed by a cross-section step which, however, only relates to the broadsides of the cross-section of the rod 21. Below the stop 20, the rod 21 is made from two parallel legs 22 which extend parallel to the center axis of the rod 21 and which are separated from one another through an incision 23. This conveys the impression of a two pronged fork.

The configuration of the end 19 of the tension device 10 with the incision 23 facilitates to manually compress the end 19 of the tension device 10, so that the broadened cross-section used as a stop 20 is reduced so that the tension device 10 can be pulled out of the support channels 13 of the stop elements 11. This way, the connection of the tension device 10 of the stop elements 11 is disengageable in a simple manner.

The long side surfaces of the tension device 10 respectively include a groove 24 extending in longitudinal direction of tension device 10, so that the rod 19 has an H-shaped cross section. Within the groove 24 a cushion made from cellular rubber or similar can be inserted in order to prevent a formation of impressions in the cargo items 5 on the one-hand side, and on the other hand side to counteract a sliding of the cargo items 5 on the tension devices 10.

FIG. 4 illustrates a lateral view of the tension device 10 with the two stop elements 11 of FIG. 2, wherein a short lateral surface with the teething 14 is illustrated. Thus, the stop elements 11 include an approximately triangular configuration in the view of FIG. 4 with two arms 25 of equal length which enclose an angle α of 60° with one another. However, the stop elements 11 differently from a triangle have a cutoff tip 26, wherein the height of the cutoff tip 26 is slightly bigger than the width of the short side surface of the tension device 10.

Figure 5:
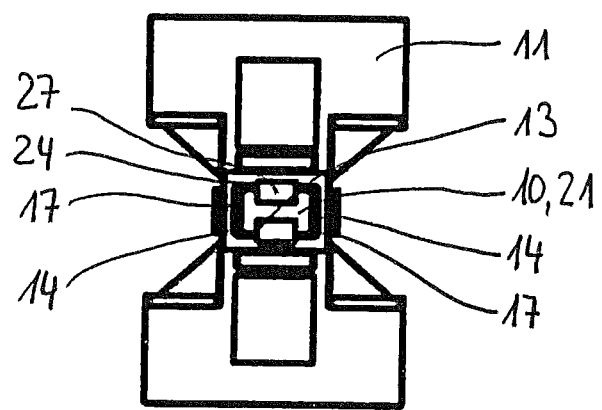
FIG. 5 illustrates a lateral view of a stop element of FIG. 2.

FIG. 5 illustrates a view according to the sectional view V-V in FIG. 4 onto the stop element 11 with the tension device 10 run through the stop element. It is evident that the tension device 10 configured as a rod 21 has an H-shaped cross-section. Furthermore, the engaging teethings 14, 17 of tension device 11 and the spring loaded tongues 16 are visible.

A respective cushion 27 configured as a cellular rubber bar is configured in both grooves 24 of the tension device 10.

FIG. 6 illustrates a three dimensional view of the stop element 11 in which the support element 13 and one of the two teethings 17 of the spring elastic tongues 16 are clearly visible. The two side surfaces 29 of the stop element 11 which have equal length respectively form a contact surface 29 of the stop element 11 with the enveloping surfaces of two cargo items 5 arranged on top of one another.

FIGS. 7-10 illustrate additional views or sectional views of the tension device 10 with the stop elements 11 of FIG. 2. Thus, the teethings 14 of the tension device 10 are illustrated in FIGS. 8 and 9 and the two cushions 27 are illustrated in FIG. 10.

Figure 11:
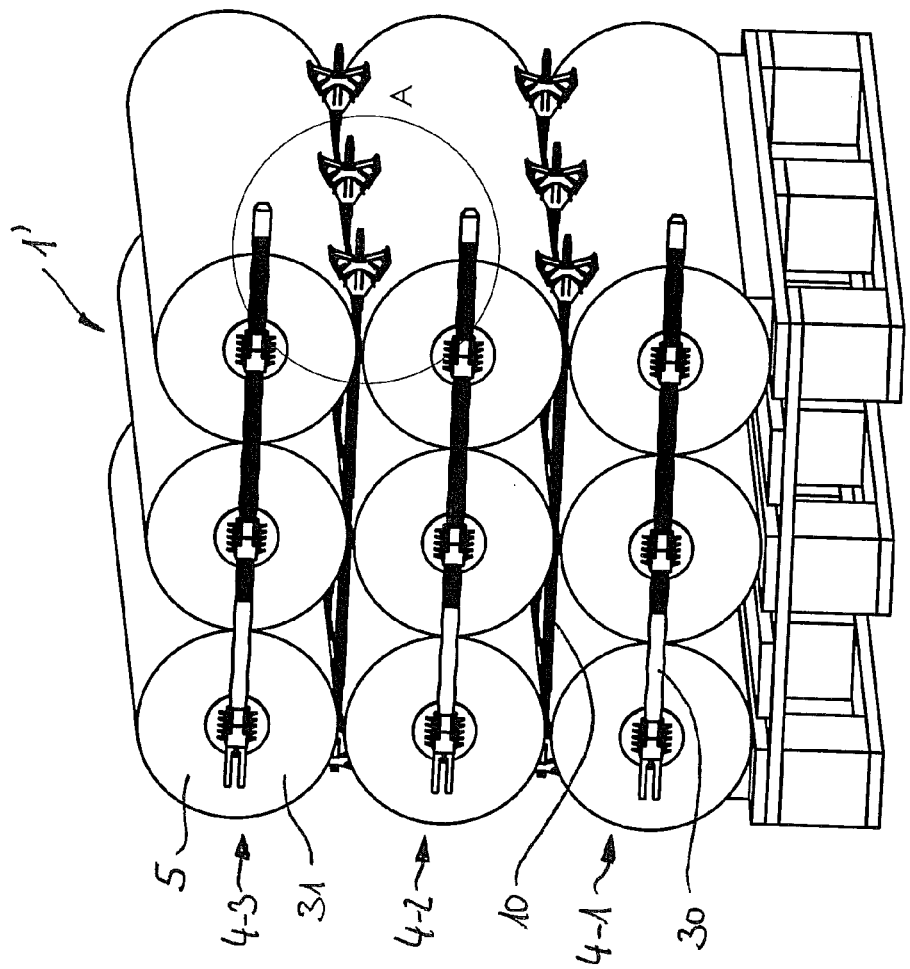
FIG. 11 illustrates a three dimensional view of an alternative transport unit; and, FIG. 12 illustrates an enlarged view of the stop elements of FIG. 11.

FIG. 11 illustrated an alternative transport unit 1' which differs from the transport unit 1 illustrated in FIG. 11 in that it includes additional tension devices 30 besides the recited tension devices 10, wherein the tension devices 30 respectively engage the faces 31 of the cargo items 5 in analogy to DE 20 2009 000 365 U1 and connect the cargo items 5 of one respective layer 4-1, 4-2, 4-3.

Figure 12:
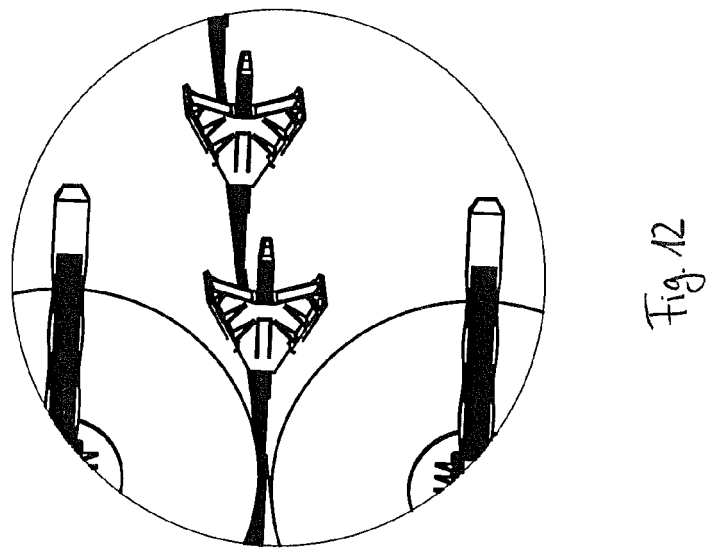

An enlarged illustration of the stop elements 11 in FIG. 11 contacting the enveloping surfaces of two cargo items 5 arranged on top of one another can be derived from FIG. 12. It is particularly evident from FIG. 12 that a gap corresponding to the height of tension devices 10 remains between the cargo items 5 arranged on top of one another. It also becomes apparent that the stop elements 11 contact the enveloping surfaces of the associated cargo items 5 with their stop surfaces 29.

REFERENCE NUMERALS AND DESIGNATIONS

1 Transport Unit
2 Plate shaped Transport Base
3 Support Surface
4-1, 4-2, 4-3 Layer
5 Cargo item
6 Center Axis
7 Wedge
8 Coil
9 Winding Core
10 Tension Device
11 Stop Element
12 First End
13 Support Channel
14 Teething (a tension device)
15 Wall Section
16 Spring-Loaded Tongue
17 Teething (in support channel)
18 Arrow
19 Second end
20 Stop
21 Rod
22 Leg
23 Incision
24 Groove
25 Arms
26 Tip
27 Cushion
28 Side Surface
29 Contact Surface
30 Tension Device
31 Face
B Width
H Height
α Angle

What is claimed is:

1. A transport unit for securing cylindrical cargo items supported on a support surface and arranged in parallel adjacent to one another in at least two layers on top of one another, wherein horizontally extending center axes of the cargo items respectively have a distance from one another and enveloping surfaces of the cargo items arranged adjacent to one another and wherein the center axes of cargo items arranged on top of one another extend essentially in the same vertical plane, the transport unit comprising:

at least one tension device extending between the two layers of cargo items from opposing outside edges of the enveloping surfaces of two layers of the cargo items, the tension device extending perpendicular to the center axes of the cargo items, and two stop elements, each stop element positioned adjacent a respective end of the tension device, each stop element engaging the cargo items in a space between two cargo items arranged on top of one another and each stop element respectively supporting the enveloping surfaces of the two cargo items, at least one of the stop elements being adjustably positionable on at least one end of the tension device for adjusting, the distance between two stop elements on the tensioning device, and the stop elements being connectable by the tension device in a force transferring manner relative to the cargo items so that a horizontally oriented force introduced by cargo items is received by the stop elements and transmitted to the tension device, wherein the tension device and the two stop elements combine to secure the cargo items within the two rows against sliding and rolling in a direction perpendicular to their center axes.

2. The transport unit according to claim 1, wherein the cargo items are supported above the at least one tension device on the tension device so that a gap remains between cargo items arranged on top of one another.

3. The transport unit according to claim 1, wherein the stop elements have a wedge shape, the wedge shape having stop surfaces with an enclosed angle of at least 45° with respect to one another.

4. The transport unit according to claim 1, wherein the stop elements do not protrude beyond vertical tangential planes of the cargo items arranged at an edge, and wherein the tangential planes are oriented towards an outer portion of the transport unit.

5. The transport unit according to claim 1, wherein the stop elements are respectively provided with a support channel for the tension device, and wherein the tension device is connectable with the stop element in a disengage-able manner through inserting the support channel.

6. The transport unit according to claim 1, wherein the tension device is selected from the group of ropes, wires, bands, bars or rods and wherein the tension device is flexible.

7. The transport unit according to claim 1, wherein the tension device further comprises a teething at least on one side at its ends, wherein the teething is configured to engage with the at least one stop element, and wherein the at least one stop element comprises a support channel and a wall section configured as a locking catch, the wall section having an elastic tongue for resiliently moving the catch into locking engagement with the teething of the tension device.

8. The transport unit according to claim 1, wherein the tension device includes a respective groove on each of its longitudinal sides oriented towards the cargo items.

9. The transport unit according to claim 8, wherein cushions are arranged within the grooves, the cushions respectively oriented towards the enveloping surfaces of the cargo items.

10. The transport unit according to claim 8, wherein the tension device is provided with a teething on its two longitudinal sides without groove.

11. A set for securing two layers of cylindrical cargo items, the layers arranged in parallel and the cargo items aligned on top of one another, comprising
- a tension device, and
- two wedge-shaped stop elements for securing adjacent end portions of the tensioning device, the two wedge-shaped elements having surface portions for engaging the two layers of cargo items transverse to the cargo items,
- at least one wedge-shaped stop element being adjustably positionable on one end of the tension device and the stop elements being connectable to the tension device for engaging the cargo elements in a force transferring manner.

12. The set according to claim 11, wherein the tension device further comprises a teething at least on one side at its ends, wherein the teething is configured to engage with the at least one wedge-shaped stop element, and
- wherein the at least one stop element comprises a support channel and a wall section configured as a locking catch, the wall section having an elastic tongue for resiliently moving the catch into locking engagement with the teething of the tension device.

13. The set according to claim 11, wherein the tension device includes a respective groove on each of its longitudinal sides oriented towards the cargo items.

14. The set according to claim 13, wherein cushions are arranged within the grooves, the cushions respectively oriented to be positioned facing towards the enveloping surfaces of the cargo items.

15. The set according to claim 14, wherein the tension device is provided with a teething on its two longitudinal sides without groove, and wherein the teething is configured to engage with the at least one wedge-shaped stop element.

16. The set according to claim 15, wherein the at least one stop element comprises a support channel and a wall section configured as a locking catch, the wall section having an elastic tongue for resiliently moving the catch into locking engagement with the teething of the tension device.

\* \* \* \* \*